United States Patent
Budal et al.

(10) Patent No.: US 7,094,176 B2
(45) Date of Patent: Aug. 22, 2006

(54) METHOD FOR CARRYING OUT GEAR SHIFTING IN A TWIN-CLUTCH GEARBOX

(75) Inventors: Lidvar Budal, Kongsberg (NO);
Wolfgang Niessen, Karlsruhe (DE);
Dietmar Lang, Höheischweiler (DE);
Alexander Schweizer,
Walzbachtal-Jöhlingen (DE); Brad Shellhammer, Bühl (DE); Jeremy Whitmer, Bühl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/711,245

(22) Filed: Sep. 3, 2004

(65) Prior Publication Data

US 2005/0064987 A1   Mar. 24, 2005

Related U.S. Application Data

(63) Continuation of application No. PCT/DE03/00645, filed on Feb. 28, 2003.

(30) Foreign Application Priority Data

Mar. 7, 2002   (DE) ................. 102 09 917

(51) Int. Cl.
*B60W 10/02* (2006.01)
*B60W 10/04* (2006.01)
*F16H 3/38* (2006.01)

(52) U.S. Cl. .............. 477/5; 477/107; 477/904; 74/340

(58) Field of Classification Search ............... 477/3, 477/5, 174, 904, 107, 109; 74/340; 903/902
See application file for complete search history.

(56) References Cited

U.S. PATENT DOCUMENTS

| 5,303,794 | A | * | 4/1994 | Hrovat et al. ............. 180/197 |
| 5,407,401 | A | * | 4/1995 | Bullmer et al. ............ 477/110 |
| 5,603,672 | A |   | 2/1997 | Zhang |
| 6,634,247 | B1 | * | 10/2003 | Pels et al. ............... 477/6 |
| 6,712,734 | B1 | * | 3/2004 | Loeffler ................. 477/5 |
| 6,909,955 | B1 | * | 6/2005 | Vukovich et al. .......... 477/120 |
| 6,941,830 | B1 | * | 9/2005 | Ibamoto et al. ........... 477/5 |
| 2001/0022245 | A1 |   | 9/2001 | Rogg |

FOREIGN PATENT DOCUMENTS

DE        19939334            3/2001
DE        0109940288 C1 *     3/2001

* cited by examiner

*Primary Examiner*—Roger Pang
(74) *Attorney, Agent, or Firm*—Simpson & Simpson, PLLC (57) ABSTRACT

The invention relates to a method for carrying out gear shifting in a twin-clutch gearbox comprising at least two gearbox input shafts which are respectively coupled to the engine by means of a clutch. According to the invention, after recognizing a desire to change gear, the clutch associated with the active torque transmitting gearbox input shaft is opened until the slip limit is reached and the engine torque is controlled according to the type of shifting in order to achieve the vehicle acceleration desired by the driver.

21 Claims, 8 Drawing Sheets

METHOD FOR CARRYING OUT GEAR SHIFTING IN A TWIN-CLUTCH GEARBOX

CROSS-REFERENCE TO RELATED APPLICATIONS

This application is filed under 35 U.S.C. § 120 and § 365(c) as a continuation of International Patent Application PCT/DE03/00645, filed Feb. 28, 2003, which application is incorporated herein by reference. This application also claims priority of German Patent Application No. 102 09 917.0, filed Mar. 7, 2002, which application is incorporated herein by reference.

BACKGROUND OF THE INVENTION

The invention relates to a method for carrying out gear shifting in a twin-clutch transmission comprising at least two transmission input shafts, each of which is coupled via a clutch to the engine.

Twin-clutch transmissions are known from vehicle technology. A twin-clutch transmission preferably has two transmission input shafts, each of which is coupled to the engine shaft via a clutch. With the method for carrying out gear shifting, it is possible to change from one gear ratio to the next higher or lower gear ratio in a twin-clutch transmission without interrupting the tractive force.

OBJECTS OF THE INVENTION

The object of the invention is to propose a method for carrying out gear shifting in a twin-clutch transmission with which crossover shifts can be carried out that are as comfortable as possible.

This objective may be achieved according to the invention by a method for carrying out gear shifting in a dual-clutch transmission comprising at least two transmission input shafts, each of which is coupled via a clutch to the engine shaft, in which method, after the recognition of a shift desire, the clutch assigned to the active torque-transmitting transmission input shaft up to the slip limit and in which method the engine torque is controlled as a function of the type of shifting in order to achieve a vehicle acceleration desired by the driver.

Accordingly, it is the aim of the shifting strategy to enable a comfortable shifting from one transmission shaft to the other transmission shaft. The shifting comfort is affected by the smooth vehicle acceleration during shifting. This means that significant and sudden changes of the drivers's desire to accelerate or in the desired wheel torque are prevented in an advantageous manner.

SUMMARY OF THE INVENTION

With the proposed method, preferably only two slip-to-grip transitions are implemented. For example, one transition can be provided while the disengaged clutch is disengaged and another transition can be provided while the new clutch is engaged. The engine torque can be actively employed for increasing or decreasing in order to ensure smooth slip-to-grip transitions on the clutches so that the engine speed can be controlled in order to achieve the slipping during the shifting and to improve the engine synchronization with respect to the speed of the new transmission input shaft. Thus, it is possible to facilitate quick and comfortable gear ratio changes with the method according to the invention, especially in an ESG twin-clutch transmission. This is particularly the case via the appropriate control of the clutches and engine torque.

Within the context of an advantageous design of the invention, it may be provided that an additional torque can be used to reach the vehicle acceleration desired by the driver. Preferably, the torque of an electric motor or the like can be used. Thus, the torque control for the output torque is preferably supported on the new transmission input shaft by the active use of the electric motor during shifting. It is especially preferred in the method according to the invention that the required vehicle acceleration is determined as a function of specific vehicle and/or transmission variables in the control of the torque of the electric motor. In the torque control, a target torque of the electric motor is calculated. The calculated target torque of the electric motor can be used if the target torque, for example, is within predetermined minimum and maximum limit values.

According to a next further development, it is also conceivable that, if the torque of the electric motor is not sufficient, one of the clutches is also driven in such a manner that the drivers's desired vehicle acceleration is achieved.

A further development of the invention may provide that the type of shifting and therefore also the type of loading of the twin-clutch transmission is preferably determined before the beginning of the shift. The determination of the type of shifting is preferably carried out in the method according to the invention in order to optimize gear changing as a function of the type of shifting. However, it is also possible that the determination of the type of shifting as a separate method is used independent of the gear shifting strategy. Thus, a method according to the invention is also provided in which the determination of the power flow in a transmission is possible, especially in a dual clutch transmission. If this method is used within the context of the proposed twin-clutch shifting strategy, the comfort in gear shifting can be further improved.

Accordingly, various methods are indicated for the determination of the power flow in the twin-clutch transmission, with which it is determined whether a pull operation or push operation is present in the transmission. Preferably, three situations can be considered for twin-clutch gear shifting in reference to which the determination of the power flow in the drivetrain is possible. The pull/push estimate may preferably be carried out directly before shifting, thus, before the beginning of the clutch change, so that the result obtained is advantageously as current as possible. It is also possible to carry out this estimate at another suitable moment.

According to another design of the invention, three possible methods are presented as examples to determine the loading state of the transmission.

According to a further development of the invention, the state may be considered in which one clutch is disengaged and the other clutch is slipping or gripping. In this case, by linear reduction or the like of the clutch torque of the torque-transmitting clutch, said clutch may be brought into the slipping state if it is not already slipping. At the beginning of the clutch slip phase, it can be decided whether the drivetrain is under pull loading or push loading. If the slip is positive on the clutch transmitting torque and, thus, the engine speed $\omega_{eng}$ is greater than the speed of the active transmission input shaft $\omega_{inpshaft}$, there is a pull loading. When there is negative slip, the transmission is under push loading. Accordingly, the following conditions result:

Pull loading: $\omega_{eng} \geq \omega_{inpshaft}$ (positive slip)

Pull loading: $\omega_{eng} < \omega_{inpshaft}$ (negative slip)

According to another further development of the invention, the state in which a clutch grips may be considered. In this situation, the entered engine torque $T_{eng}$ and the dynamic engine torque $\dot{\omega}_{eng} \cdot J_{eng}$ are considered. If engine torque $T_{eng}$ is greater than the dynamic engine torque $\dot{\omega}_{eng} \cdot J_{eng}$, the transmission is in the pulling state, i.e., the engine would be accelerated if he engaged clutch is disengaged at this moment. In the reverse case, a pushing state exists if, specifically, the entered engine torque $T_{eng}$ is smaller than the dynamic engine torque $\dot{\omega}_{eng} \cdot J_{eng}$, $\dot{\omega}_{eng}$ being the engine acceleration and $J_{eng}$ being the moment of inertia of the engine. From these the following conditions arise:

Pulling state: $T_{eng} \geq \dot{\omega}_{eng} \cdot J_{eng}$

Pushing state: $T_{eng} < \dot{\omega}_{eng} \cdot J_{eng}$

Finally, according to another design of the invention, the state can be considered in which neither of the clutches is gripping. In this situation, a pull mode may be defined by the sum of the transmitted torque of the clutches being positive. Transferred clutch torque $$T_{clA/B}^{transferred}$$

is equal to the minimum value from set clutch torque $T_{clA/B}$ and the slip limit of the clutch $T_{clA/B}^{slip}$. From these the following conditions arise:

Pull loading: $\mathrm{sign}(\omega_{eng} - i_A \cdot \omega_{vehicle}) \cdot i_A \cdot T_{clA}^{transferred} +$
$\mathrm{sign}(\omega_{eng} - i_B \cdot \omega_{vehicle}) \cdot i_B \cdot T_{clB}^{transferred} \geq 0$ Push loading: $\mathrm{sign}(\omega_{eng} - i_A \cdot \omega_{vehicle}) \cdot i_A \cdot T_{clA}^{transferred} +$
$\mathrm{sign}(\omega_{eng} - i_B \cdot \omega_{vehicle}) \cdot i_B \cdot T_{clB}^{transferred} < 0$ In this context, $\omega_{vehicle}$ is the vehicle speed, $i_A$ is the overall gear ratio of the first transmission input shaft, $i_B$ is the overall gear ratio of the second transmission input shaft, $$T_{clA}^{transferred}$$

is the transferred clutch torque of the first clutch and $$T_{clB}^{transferred}$$

is the transferred clutch torque of the second clutch.

Using the indicated methods for the determination of the pulling/pushing state, it is advantageously possible to use the appropriate shifting strategy (pull-up shift, push-up shift, pull-downshift or push-downshift) during a twin-clutch shift. In this way, unnecessary changes from the pulling state to the pushing state or vice-versa, and therefore also running through the transmission lash, which can have a negative effect on the comfort of the driver, are prevented. Consequently, the impact on comfort is minimized by the presented twin-clutch strategy.

Within the context of a next design, the slip limits of the two clutches may be determined by the method according to the invention. Preferably, the slip limit $T_{clA}^{slip}$ of the first clutch (A) may be determined according to the following formula:

$$T_{clA}^{slip} = \left| T_{eng} - J_{eng} \frac{T_{eng} + \frac{T_{vehicle}}{i_A} - \left|\frac{i_B}{i_A} - 1\right| \cdot T_{clB}}{J_{eng} + \frac{J_{vehicle}}{i_A^2}} - \mathrm{sign}\left(1 - \frac{i_B}{i_A}\right) \cdot T_{clB} \right|$$

To evaluate or determine the slip limit, it is necessary to know the running resistance $T_{vehicle}$ of the vehicle or the external vehicle torque $T_{vehicle}$. Therefore, it may be provided according to another design of the invention presented here that at least one possibly simple and precise method is specified for the determination of the external vehicle torque in the twin-clutch transmission.

To implement this strategy, the determination of external vehicle torque $T_{vehicle}$ in the twin-clutch transmission is necessary. Therefore, the external torques that affect the vehicle, such as the air resistance, the friction resistance between the road and the wheels, the incline of the road (gravitational force of the motor vehicle while driving up/down hills) and/or the operation of the vehicle brake are taken into consideration.

If, for example, clutch A grips and clutch B is disengaged or slips, external vehicle torque $T_{vehicle}$ may be determined from the following equation:

$$T_{vehicle} = i_A \cdot \left[ \dot{\omega}_{eng}\left(J_{eng} + \frac{J_{vehicle}}{i_A^2}\right) - T_{eng} + \left|\frac{i_B}{i_A} - 1\right| \cdot T_{clB} \right]$$

According to a further development of the invention, the state may also be considered in which first clutch A grips and second clutch B is preferably disengaged. In this situation it can be brought into the slipping state by linear reduction of the clutch torque of torque-transmitting clutch A. In particular after the grip-to-slip transition of clutch A, the external vehicle torque may be determined. It is also possible that the external vehicle torque is determined after a slip-to-grip transition. In these two methods, the external vehicle torque results from the following equation:

$$T_{vehicle} = \frac{1}{i_A \cdot J_{eng}} \cdot$$
$$(J_{vehicle} \cdot T_{eng} - \mathrm{sign}\{\omega_{eng} - i_A \cdot \omega_{vehicle}\} \cdot \{i_A^2 \cdot J_{eng} + J_{vehicle}\} \cdot T_{clA})$$

Within the context of a further development, the state may be considered in which none of the clutches is gripping. In this case, the following equation produces the external vehicle torque:

$T_{vehicle} =$
$\dot{\omega}_{vehicle} \cdot J_{vehicle} - \mathrm{sign}(\omega_{eng} - i_A \cdot \omega_{vehicle}) \cdot i_A \cdot T_{clA} - \mathrm{sign}(\omega_{eng} - i_B \cdot \omega_{vehicle}) \cdot i_B \cdot T_{clB}$ In the aforementioned equations, $\omega_{eng}$ is the engine speed, $\omega_{vehicle}$ is the vehicle speed, $\dot{\omega}_{eng}$ is the engine acceleration, $\dot{\omega}_{vehicle}$ is the vehicle acceleration, $T_{eng}$ is the engine torque, $J_{eng}$ is the moment of inertia of the engine, $i_A$ is the overall gear ratio of the first, old transmission input shaft, $i_B$ is the overall gear ratio of the second, new transmission input shaft, $T_{clA}$ is the transmitted clutch torque of the first, old clutch and $T_{clB}$ is the transmitted clutch torque of the second, new clutch.

In the strategy presented here for determination of the external vehicle torque in a twin-clutch transmission, it is especially advantageous that in this way the calculations of the slip limits of the clutches are possible and, thus, the implementation of the method of the invention for carrying out gear shifting in the transmission control in the simplest possible way is possible.

It is conceivable that the method for determination of the external vehicle torque $T_{vehicle}$ is also used independent of the proposed shifting strategies.

In the method of the invention for carrying out gear shifting, four main shifting situations can be distinguished according to another design of the invention:

Pull upshifts, an upshift being transmitted with positive torque from the engine to the output torque. Consequently, the engine pulls the vehicle (normal type of upshift).

Push upshift: upshift with negative torque that is transmitted from the engine to the output torque. Consequently, the engine pushes the vehicle (e.g., upshift while driving downhill after an acceleration).

Pull downshift: downshift with positive torque that is transmitted from the motor to the output. Consequently, the engine pulls the vehicle (e.g., kickdown).

Push downshift: downshift with negative torque that is transmitted from the motor to the output. Consequently, the engine pushes the vehicle (normal type of downshift).

In the method of the present invention, different shifting strategies are used as a function of the particular type of shifting that is present.

In the context of a further development, the engine torque, for example, can be increased during an upshift in pulling mode or a pulling upshift in order to form a slip reserve and keep the engine speed above the speed of the old transmission input shaft that is assigned to the starting gear. After that, for example, the old clutch that is assigned to the starting gear can be disengaged with a constant ramp function, and the new clutch that is assigned to the target gear can be engaged with the same ramp function, the engine torque being reduced to a minimum in order to synchronize the engine speed with the speed of the new transmission input shaft that is assigned to the target gear, and the torque of the electric motor being driven in such a manner that the vehicle acceleration desired by the driver is achieved.

A next design of the invention may provide that the engine torque is reduced to a minimum during an upshift in push mode or push upshifting in order to synchronize the engine speed with the speed of the new transmission. After that, the vehicle acceleration can be driven using the old clutch. If the engine speed drops below the speed of the new shaft, the old clutch can be disengaged and the new clutch can be engaged with a constant ramp function. Finally, the torque of the electric motor can be driven in such a manner that the vehicle acceleration desired by the driver is achieved.

In the method according to the invention, the engine torque may be increased when there is a downshift in pulling mode or a pulling downshift in order to synchronize the engine speed with the speed of the new transmission input shaft. The vehicle acceleration is driven with the old clutch. If the engine speed climbs above the speed of the new shaft, the old clutch may be disengaged using a constant ramp function and the new clutch engaged. Finally, the torque of the electric motor is driven in such a manner that the vehicle acceleration desired by the driver is achieved.

According to a next further development, when there is a downshift in push mode or a push downshift, the engine torque may be reduced to a minimum in order to form a slip reserve and keep the engine torque below the speed of the old transmission input shaft. Moreover, the old clutch can be disengaged with a constant ramp function and the new clutch can be engaged with the same ramp function. Then the engine torque may be increased in order to synchronize the engine speed with the speed of the new transmission input shaft. Finally, the torque of the electric motor may be driven in such a manner that the vehicle acceleration desired by the driver is achieved.

The aforementioned shifting strategies for the individual types of gear shifting may also be modified and combined with each other if desired in order to further improve the proposed method for carrying out a shifting, especially regarding shifting comfort.

BRIEF DESCRIPTION OF THE DRAWINGS

Additional advantages and advantageous designs arise from the dependent claims and the drawings described below. In the drawing:

DETAILED DESCRIPTION OF THE PREFERRED EMBODIMENT

Figure 1:
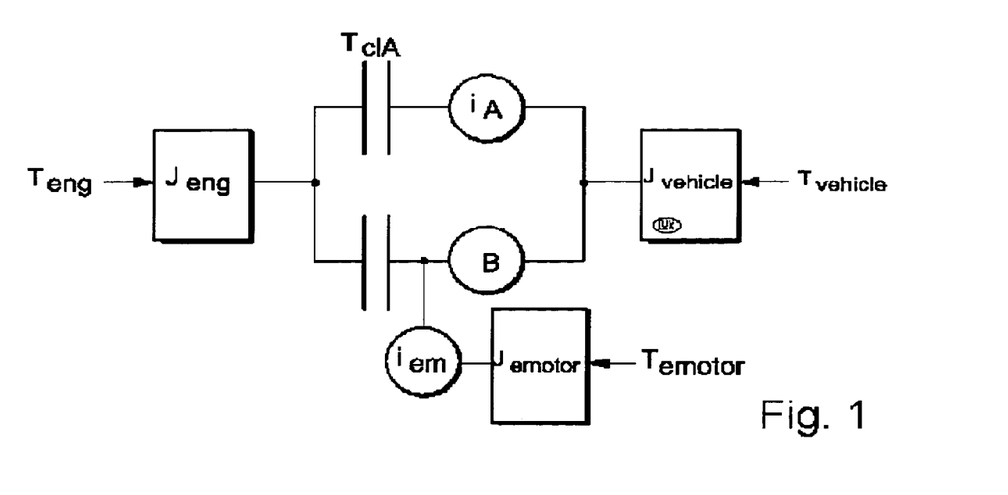
FIG. 1 shows a diagrammatic model of a drive train of a vehicle having a twin-clutch transmission.

FIG. 1 illustrates a diagrammatic model of the drive train of a vehicle having a twin-clutch transmission. The method of the invention is explained in reference to the model. The model comprises an internal combustion engine with a torque that is equal to the moment of inertia $J_{eng}$ and an overall engine torque $T_{eng}$. The first transmission input shaft is connected to the engine via a first clutch so that a maximum torque $T_{clA}$ can be transmitted and is connected to a first gear having a ratio $i_A$ with the output shaft. The second transmission input shaft is likewise connected to the engine via a second clutch so that a maximum torque $T_{clB}$ may be transmitted and is also connected to the output shaft via a second gear having the ratio $i_B$. Moreover, an electric motor is provided with a moment of inertia $J_{emotor}$ and a torque $T_{emotor}$ and is permanently engaged with the second transmission input shaft via a gear ratio $i_{em}$. The output shaft or driven shaft is connected to the engine via a moment of inertia of the vehicle $J_{vehicle}$, which is affected by a running resistance $T_{vehicle}$. The following simplifications are provided in the model:

Gears on both transmission input shafts are pre-selected, i.e., no gear synchronization is simulated.

The engine, the electric motor and the clutch dynamics are assumed to be linear and there is no response time before the feedback signal. That means the change of the torque begins immediately after the request and with a constantly defined ramp in relation to the requested torque. The real dynamic behavior of the engine can exert a significant effect in the shifting strategy.

Play in the drive train is not taken into consideration in the model.

Damping and elasticity in the drive train is also not taken into account in the model.

FIGS. 2 to 5 illustrate the method of the invention, or the shifting strategy for different types of shifting with electric motor support. In each of these figures three diagrams are shown one after the other, the speed of the motor, the first transmission input shaft and the second transmission input shaft as well as the clutch slip being shown over time in the top diagram. In the center diagram, the clutch torque $T_{clA}$ of the first clutch, the clutch torque $T_{clB}$ of the second clutch, the engine torque $T_{eng}$ and the torque $T_{emotor}$ of the electric motor are represented over time, different driving states 1 to 11 being indicated (driving state 1 "Begin", driving state 2 "Driving with shaft A", driving state 3 "Prepare upshift", driving state 4 "Torque transmission on Shaft B", driving state 5 "End upshift", driving state 6 "Driving with shaft B", driving state 7 "Prepare downshift", driving state 8 "Torque transmission on shaft A", driving state 9 "End downshift", driving state 10 "Neutral", driving state 11 "Other"). While in the bottom diagram, the speed of the vehicle and the vehicle acceleration are illustrated over time. What is noteworthy is that the shifting can be carried out more quickly if the torque ramp of the clutches and of the engine are increased and the new clutch has a higher torque during phase 3.

Figure 2:
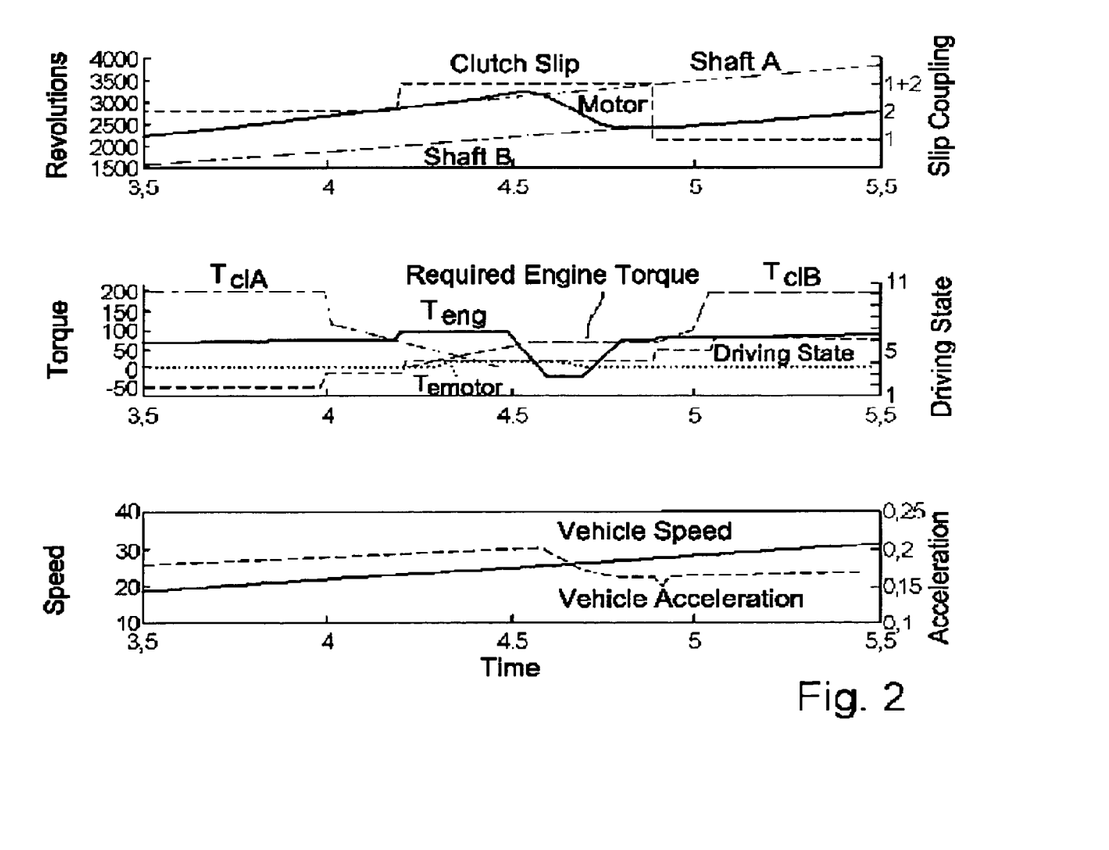
FIG. 2 shows a simulation of a pulling upshift with electric motor support according to a method of the invention.

Illustrated in FIG. 2 is a pulling upshift. In this figure the pulling torque on the output should be maintained during the overall torque transfer from the old transmission input shaft to the new transmission input shaft. This is achieved by increasing the engine speed above the speed of the old transmission input shaft. In this situation, the old clutch is disengaged in order to reduce the vehicle acceleration and engaged in order to increase the vehicle acceleration. These reactions can cancel each other out. The torque of the electric motor is used to adjust or drive the vehicle acceleration.

The torque of the old clutch is reduced up to the slip limit and then engine torque $T_{eng}$ increased until the old clutch slips. Engine torque $T_{eng}$ is controlled above the vehicle acceleration desired by the driver in order to ensure that the engine speed is maintained above the speed of the old transmission input shaft. The torque transmitted by the old clutch is reduced over a constant ramp to the value zero, while the torque transmitted by the new clutch is increased with the same ramp to the slip limit or slightly above it. The torque $T_{emotor}$ of the electric motor is controlled in such a manner that the driver desired vehicle acceleration is achieved. If the torque on the old disengaged clutch assumes the zero value, the engine torque $T_{eng}$ is reduced to a minimum torque in order to accelerate the engine synchronization. The new clutch is driven up to the slip limit or slightly over it, it being possible to further regulate the vehicle acceleration with the electric motor. If the engine speed is almost synchronized with the speed of the new transmission input shaft, the engine torque $T_{eng}$ is increased to just below the driver's desired engine torque in order to achieve a continuously gentle slip-to-grip transition. The vehicle acceleration can then be driven further with the electric motor.

Figure 3:
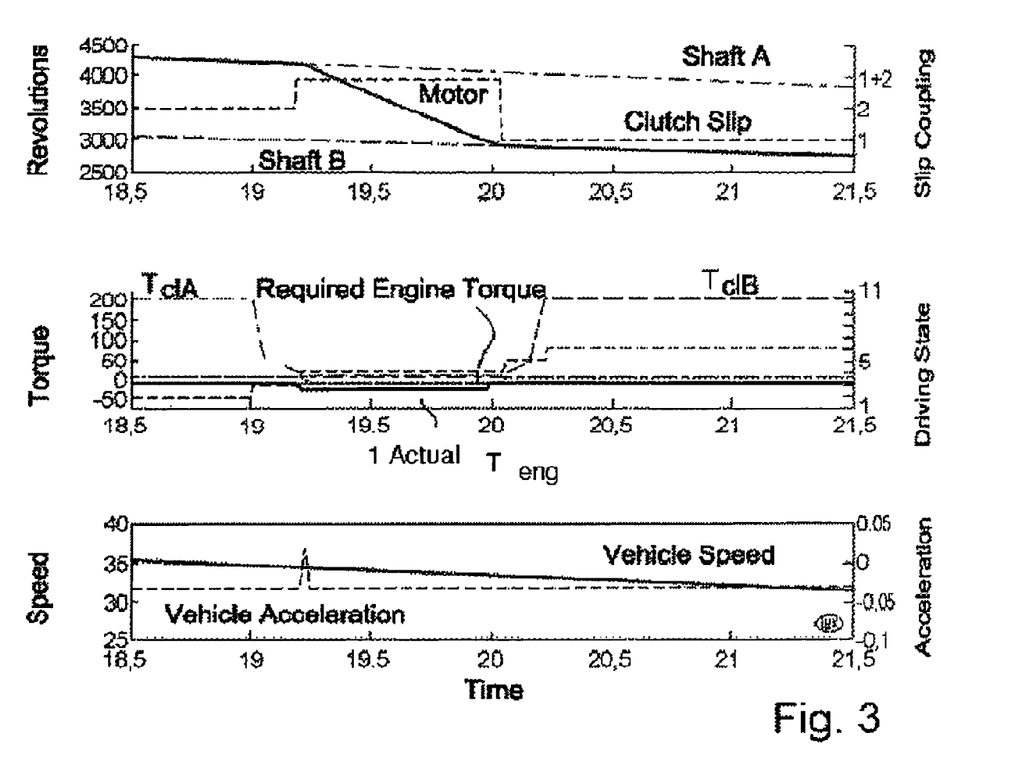
FIG. 3 shows a simulation of a pushing upshift with electric motor support according to a method of the invention.

Illustrated in FIG. 3 is a pushing upshift with support of an electric motor according to the proposed shifting strategy. In this illustration it is noteworthy that the peak in the acceleration curve is a numerical effect of the simulation process and consequently is not to be expected for the vehicle.

The pushing torque should be maintained at the output during the entire torque transition from the old transmission input shaft to the new transmission input shaft. This is normally achieved by a reduction of the engine speed below the speed of the new transmission input shaft before the torque transmission. Otherwise, the disengagement of the old clutch and the engagement of the new clutch lead to an increase in the vehicle acceleration. However, with the support of torque $T_{emotor}$ of the electric motor, it is possible, on the other hand, to make it so that the torque transmission can be carried out before the engine speed is below the speed of the new transmission input shaft. In this case, the new clutch can support the synchronization of the engine speed and therefore significantly accelerate the shifting.

The torque of the old clutch is reduced down to the slip limit and then engine torque $T_{eng}$ is reduced until the old clutch slips. After that, engine torque $T_{eng}$ is reduced to a minimum, the transmitted torque of the old clutch being reduced to the value zero via a constant ramp, while the transmitted torque of the new clutch is increased with the same ramp to the slip limit or slightly above it, torque $T_{emotor}$ of the electric motor being controlled in such a manner that the drivers's desired vehicle acceleration is achieved. The new clutch is driven up to the slip limit or slightly above it, it being possible to further regulate the vehicle acceleration with the electric motor until the motor synchronization is achieved. Engine torque $T_{eng}$ is increased to just below the drivers's desired engine torque in order to achieve a continuous slip-to-grip transition if the engine speed is almost synchronized with the speed of the new transmission input shaft. The vehicle acceleration can then be driven further with the electric motor.

Figure 4:
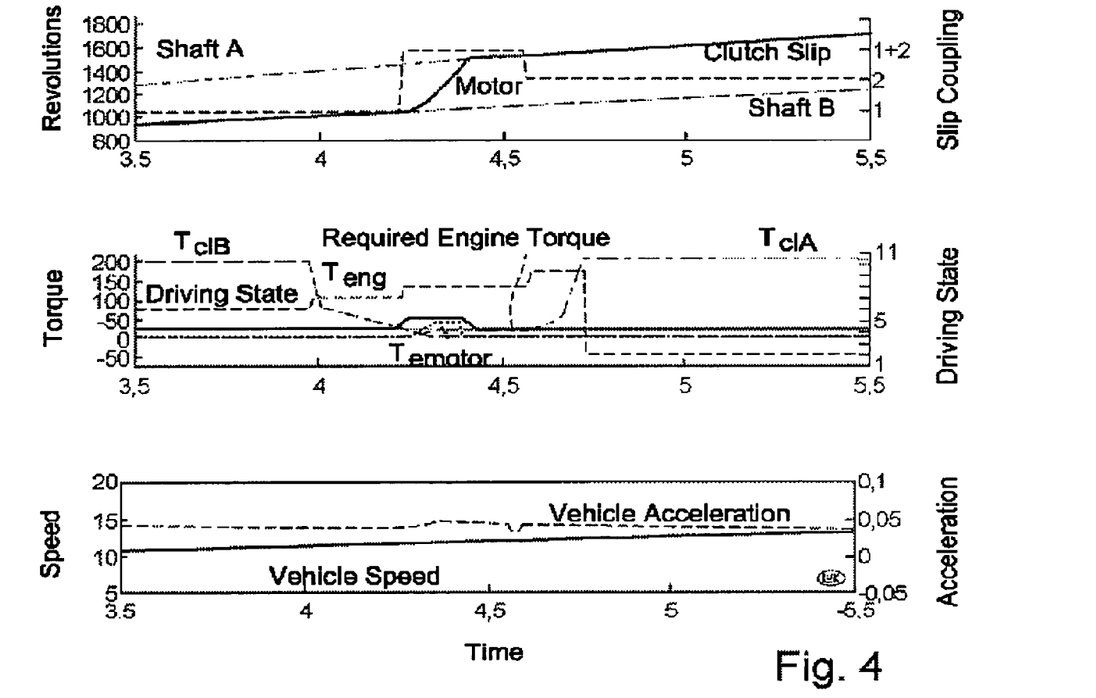
FIG. 4 shows a simulation of a pulling downshift with electric motor support according to a method of the invention.

Illustrated in FIG. 4 is a simulation of a pulling downshift with the support of the electric motor. In this figure it is noteworthy that the shifting can be carried out more quickly if the torque ramps of the clutches and of the engine are increased and the new clutch takes on a higher torque during phase three.

The pulling torque should be maintained at the output during the overall torque transfer from the old transmission input shaft to the new transmission input shaft. This is normally achieved by an increase of the engine speed above the speed of the new transmission input shaft before the torque transfer. Otherwise, the disengagement of the old clutch and the engagement of the new clutch lead to the reduction of the vehicle acceleration. However, the support of torque $T_{emotor}$ of the electric motor can make it so that the torque transfer may be carried out before the engine speed is above the speed of the new transmission input shaft. In this case, the new clutch can support the synchronization of the engine speed and thereby accelerate the shifting significantly.

The torque of the old clutch is reduced down to the slip limit and then engine torque $T_{eng}$ is increased until the old clutch slips. Thereafter, engine torque $T_{eng}$ is driven by the vehicle acceleration desired by the driver. The transmitted torque of the old clutch is reduced via a constant ramp to the value zero, while the transmitted torque of the new clutch is increased with the same ramp to the slip limit or slightly above it. Torque $T_{emotor}$ of the electric motor is controlled in such a manner that the driver's desired vehicle acceleration is achieved. The new clutch is driven up to the slip limit or slightly above it, it being possible to further regulate the vehicle acceleration with the electric motor until the motor synchronization is achieved. Engine torque $T_{eng}$ is increased up to just below the driver's desired engine torque in order to achieve a continuous slip-to-grip transition if the engine speed is almost synchronized with the speed of the new transmission input shaft. The vehicle acceleration may then be further driven with the electric motor.

Figure 5:
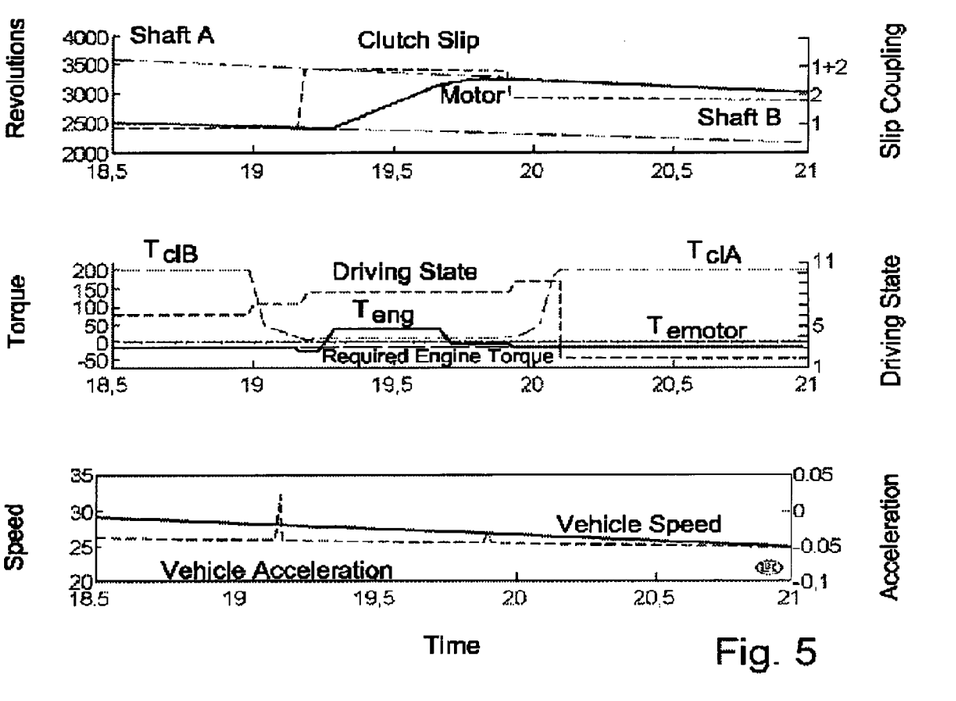
FIG. 5 shows a simulation of a pushing downshift with electric motor support according to a method of the invention.

Illustrated in FIG. 5 is a pushing downshift with the support of the electric motor. It is noteworthy that in this simulation the electric motor only slightly supports the shifting procedure in order to achieve the desired vehicle acceleration, which therefore nearly assumes the value zero. The first peak for the vehicle acceleration is a numerical effect in this simulation.

The pushing torque should be maintained at the output during the entire torque transfer from the old transmission input shaft to the new transmission input shaft. This is normally achieved by a reduction of the engine speed below the speed of the new transmission input shaft before the torque transfer. In this situation the old clutch is disengaged in order to increase the vehicle acceleration and the new clutch is engaged in order to reduce the vehicle acceleration. These reactions can cancel each other out. Torque $T_{emotor}$ of the electric motor is used in order to adjust or drive the vehicle acceleration.

The torque of the old clutch is reduced down to the slip limit and then engine torque $T_{eng}$ is decreased until the old clutch slips. After that the engine torque $T_{eng}$ is reduced to a minimum, the transmitted torque of the old clutch being reduced via a constant ramp to the value zero, while the transmitted torque of the new clutch is increased with the same ramp to the slip limit or slightly above it, torque $T_{emotor}$ of the electric motor being controlled in such a manner that the driver's desired vehicle acceleration is achieved. If the torque on the old disengaged clutch assumes the value zero, engine torque $T_{eng}$ increases in order to be far enough above the engine torque desired by the driver that the motor synchronization is accelerated. The new clutch is driven up to the slip limit or slightly above it, it being possible to regulate the vehicle acceleration with the electric motor. If the engine speed is nearly synchronized with the speed of the new transmission input shaft, engine torque $T_{eng}$ is increased to just above the driver's desired engine torque in order to achieve a continuous, gentle slip-to-grip transition. The vehicle acceleration may then be further driven with the electric motor.

Figure 6:
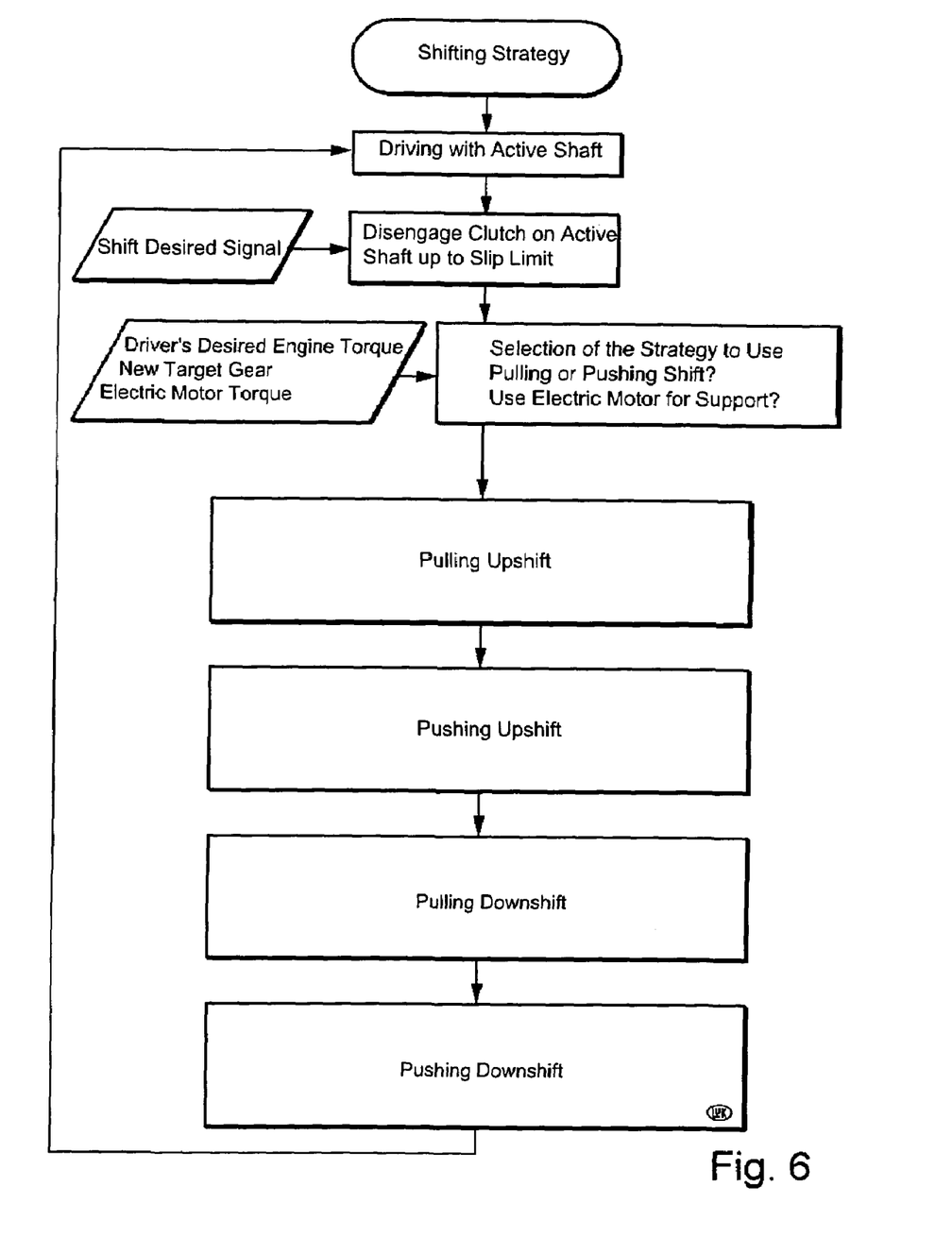
FIG. 6 shows a flow diagram of the method of the invention.

Illustrated in FIG. 6 is a flow diagram of the method according to the invention for carrying out gear shifting with a twin-clutch transmission (shifting strategy) for pulling upshifts, pushing upshifts, pulling downshifts and/or pushing downshifts. With the shifting strategy, a comfortable shifting is proposed, especially in an ESG transmission with and without the support of an electric motor. Altogether, a control strategy for gear ratio change is thus presented, preferably for an ESG twin-clutch transmission. The goal of this strategy is the control of the output torque or the vehicle acceleration in order to carry out a comfortable crossover shift. The primary control means can thus be the electric motor. If torque $T_{emotor}$ of the electric motor is not large enough, one of the clutches or the like can also be used to control the output torque.

In this control strategy, four different types of crossover shifts in particular are defined, namely: pulling upshifts, pushing upshifts, pulling downshifts and pushing downshifts. All of these shifting types can be carried out with minimal bucking and a high level of comfort, a sufficient torque $T_{emotor}$ being provided by the electric motor or the internal combustion engine. The pushing upshifts and the pulling downshifts can clearly be carried out in a quicker, more comfortable manner when the electric motor is used. Furthermore, shifting strategies with the electric motor are possible that reduce the energy input for the clutches in order to thereby minimize the heat load and the wear.

In a pulling upshift, the engine torque $T_{eng}$ is increased in order to develop a slip reserve, and the engine speed is kept above the speed of the old transmission input shaft. Then the old clutch is disengaged with a constant ramp function and the new clutch is engaged with the same ramp function. Engine torque $T_{eng}$ is reduced to a minimum in order to synchronize the engine speed with the speed of the new transmission input shaft that is assigned to the target gear. Torque $T_{emotor}$ of the electric motor is driven in such a manner that the vehicle acceleration desired by the driver is achieved.

In a pushing upshift, engine torque $T_{eng}$ is reduced to a minimum in order to synchronize the engine speed with the speed of the new transmission input shaft. Then the vehicle acceleration is driven with the old clutch. If the engine speed drops below the speed of the new shaft, the old clutch is disengaged with a constant ramp function and the new clutch is engaged. Finally, torque $T_{emotor}$ of the electric motor is driven in such a manner that the driver's desired vehicle acceleration is achieved.

In a pulling downshift, engine torque $T_{eng}$ is increased in order to synchronize the engine speed with the speed of the new transmission input shaft. Then the vehicle acceleration is driven with the old clutch. If the engine speed climbs above the speed of the new shaft, the old clutch is disengaged with a constant ramp function and the new clutch is engaged. Torque $T_{emotor}$ of the electric motor is driven in such a manner that the vehicle acceleration desired by the driver is achieved.

In a pushing downshift, engine torque $T_{eng}$ is reduced to a minimum in order to develop a slip reserve and to keep the engine speed under the speed of the old transmission input shaft. Then the old clutch is disengaged with a constant ramp function and the new clutch is engaged with the same ramp function. The engine torque $T_{eng}$ is increased in order to synchronize the engine speed with the speed of the new transmission input shaft. Torque $T_{emotor}$ of the electric motor is driven in such a manner that the vehicle acceleration desired by the driver is achieved.

Figure 7:
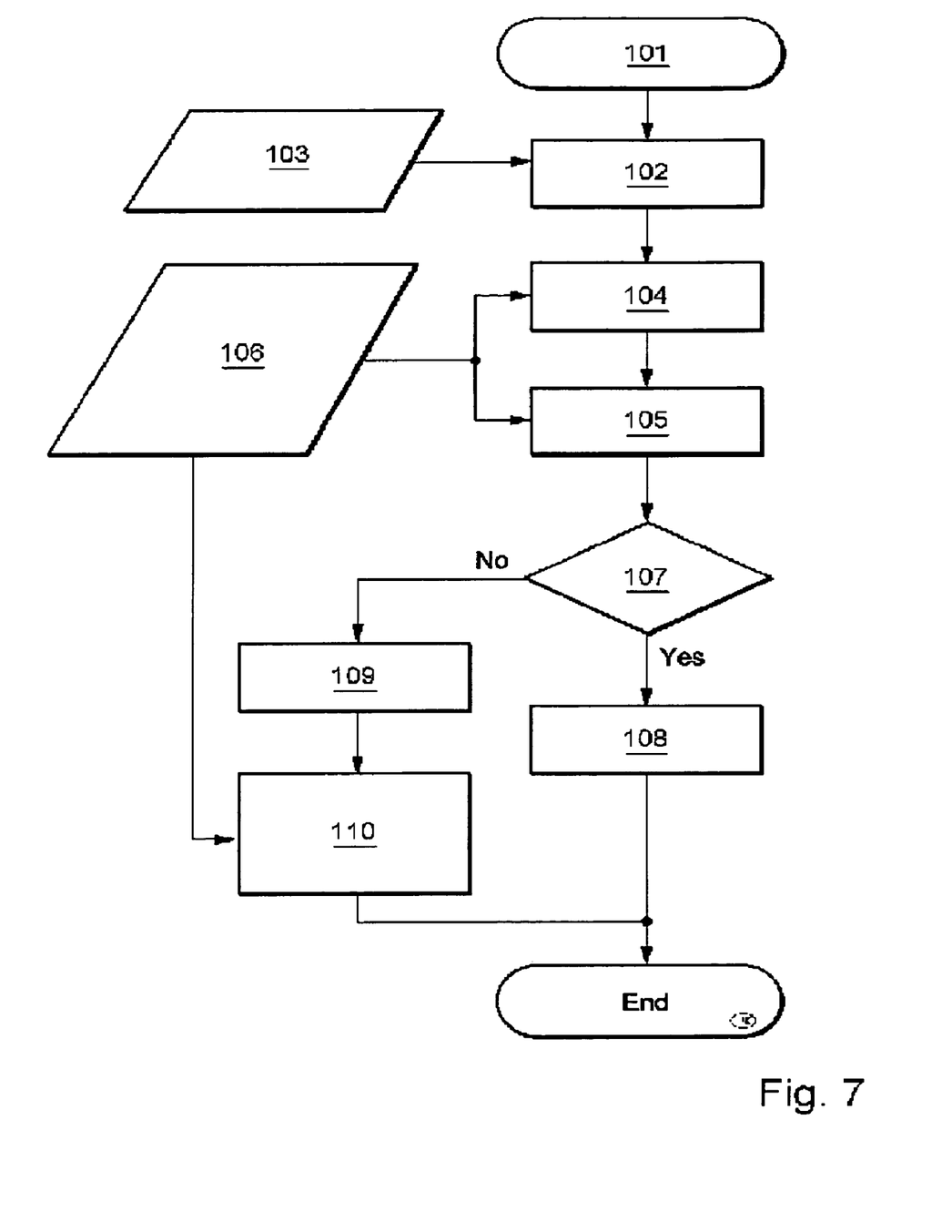
FIG. 7 shows a flow diagram of the drive of the electric motor.

FIG. 7 shows a flow diagram for the torque drive of the electric motor.

It is provided in this figure that, to achieve the vehicle acceleration desired by the driver, torque $T_{emotor}$ of the electric motor is used as an additional torque (Box 101). In the driving of torque $T_{emotor}$, the required vehicle acceleration (Box 102) is determined as a function of specific vehicle and/or transmission variables (Box 103). The gear ratio on the transmission input shafts, the engine speed, the vehicle speed and the vehicle acceleration, to name a few examples, can be used as vehicle and/or transmission variables. After this, external vehicle torque $T_{vehicle}$ is determined (Box 104) and then a target torque of the electric motor is calculated (Box 105) as a function of vehicle and/or transmission variables (Box 106). For example, the aforementioned variables (Box 103) and also clutch torque $T_{clA}$, clutch torque $T_{clB}$, the engine moment of inertia, the electric motor moment of inertia, the vehicle moment of inertia and the clutch state may be used as vehicle and/or transmission variables. Finally, a check is made of whether the calculated target torque of the electric motor is within predetermined minimum and maximum limit values (Box 107). If yes, then the target torque is used (Box 108). If torque $T_{emotor}$ of the electric motor is not sufficient (Box 109), the clutch torque of one of the two clutches' acceleration can also be used to control the vehicle acceleration (Box 110).

Figure 8:
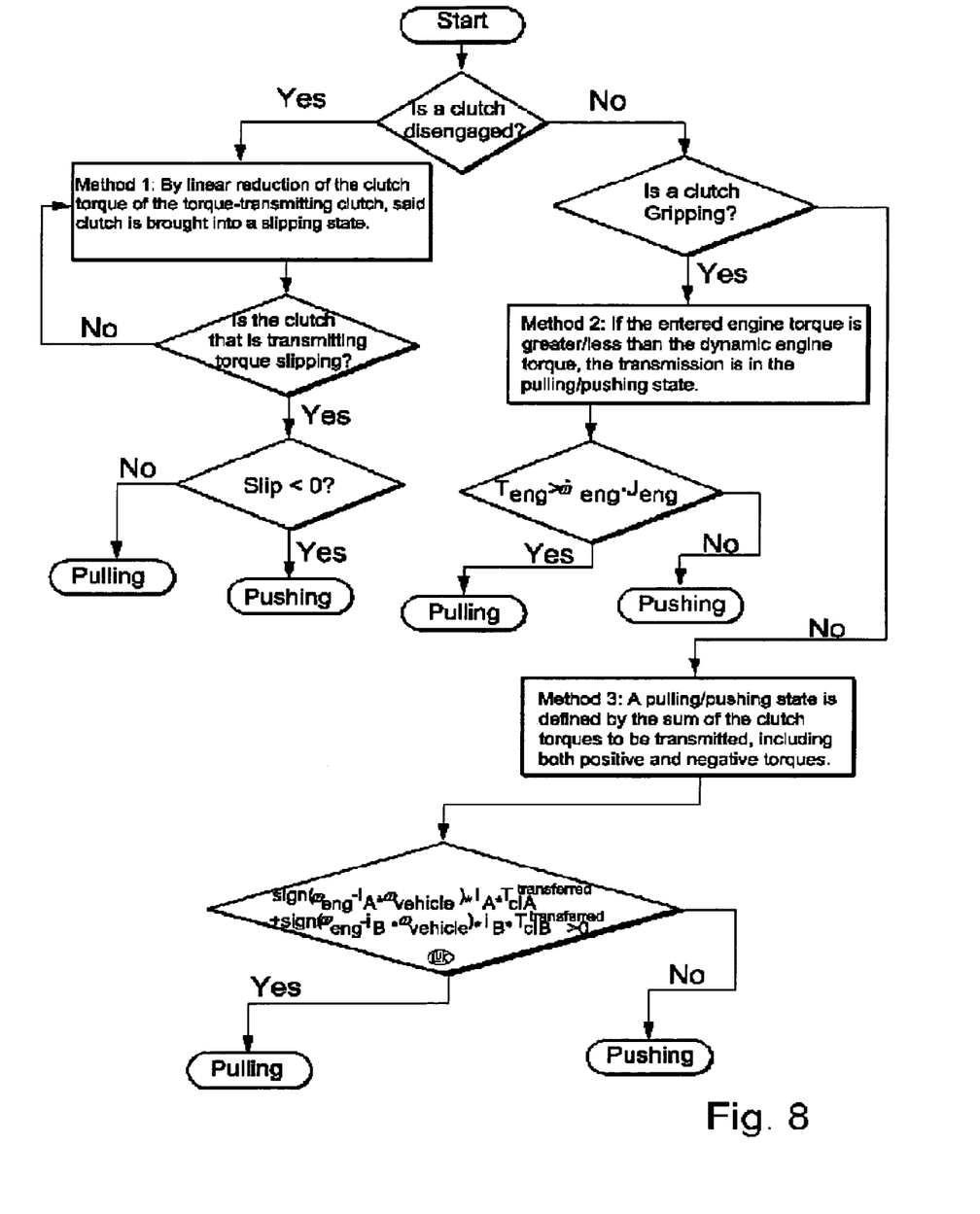
FIG. 8 shows a flow diagram of a possible pull/push estimate.

Illustrated in FIG. 8 is a flow diagram that explains the pull-push estimation used in the method of the invention.

In this figure a check is first made of whether one of the clutches is disengaged. If a clutch is disengaged, a first method is used to determine the loading state in which, by linear reduction of the clutch torque of the torque-transmitting clutch, said clutch is brought into a slipping state. After that, a check is made as to whether positive slip (pulling load) or negative slip (pushing load) is present.

If neither of the two clutches is disengaged and at least one clutch is gripping, a second method is carried out in which the entered engine torque $T_{eng}$ and the dynamic engine torque $\dot{\omega}_{eng} \cdot J_{eng}$ are taken into consideration. The twin-clutch transmission is in pulling operation if entered engine torque $T_{eng}$ is greater than dynamic engine torque $\dot{\omega}_{eng} \cdot J_{eng}$. The pushing operation is present if the entered engine torque $T_{eng}$ is less than dynamic engine torque $\dot{\omega}_{eng} \cdot J_{eng}$.

Should neither of the clutches be in the gripping state, the pull/push state is defined by the sum of the clutch torques to be transmitted being positive (pull state) or negative (push state).

It is possible that the second and the third method are also used if a clutch is disengaged. However, it has been shown that the first method supplies more accurate values.

Figure 9:
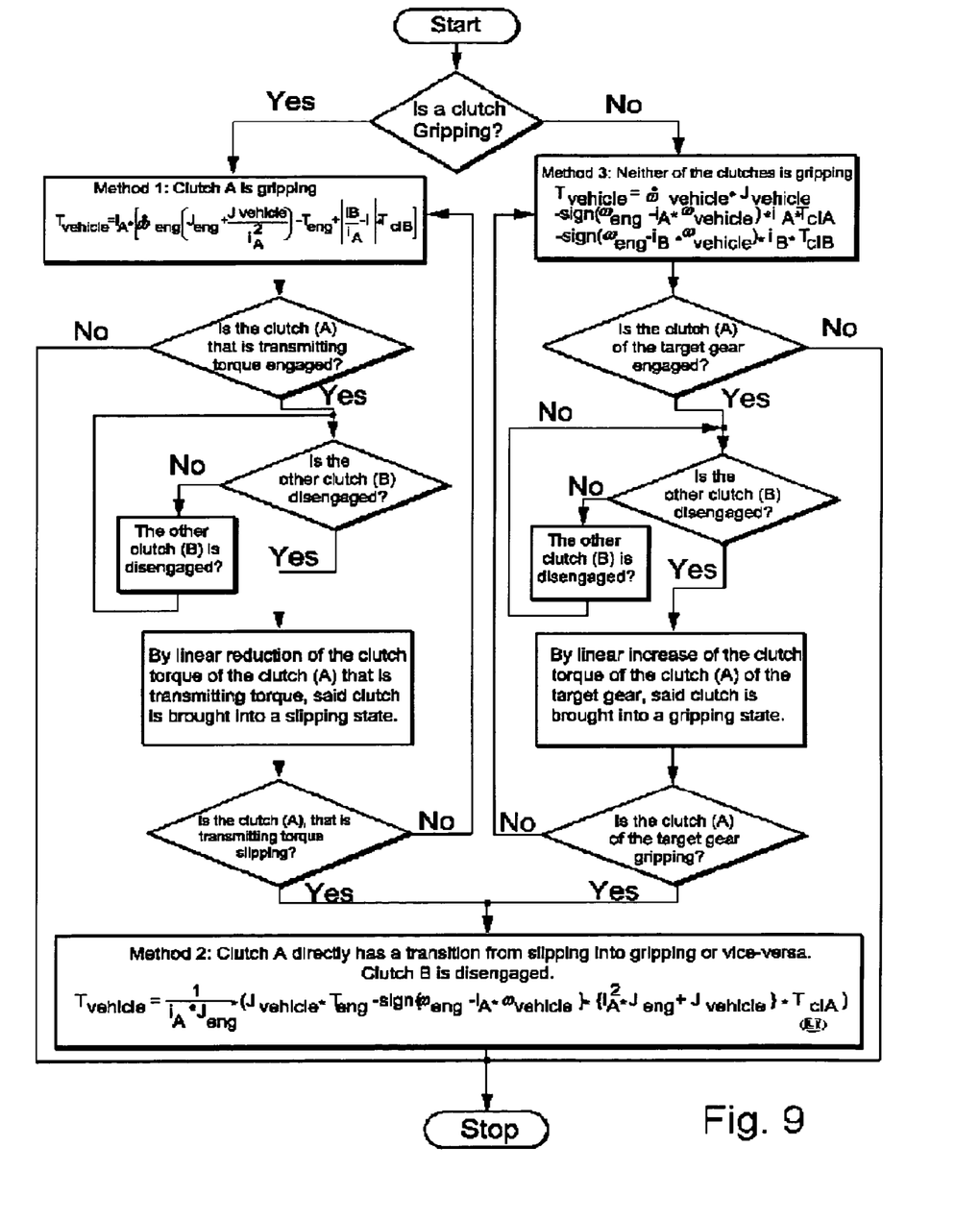
FIG. 9 shows a flow diagram of a possible estimate of an external vehicle torque.

Illustrated in FIG. 9 is a flow diagram of the estimation of the external vehicle torque. Three different methods are presented in the figure.

First a check is made of whether one of the clutches is gripping. If, for example, clutch A is gripping and clutch B is disengaged or slipping, external vehicle torque $T_{vehicle}$ may be determined from the following equation:

$$T_{vehicle} = i_A \cdot \left[ \dot{\omega}_{eng}\left(J_{eng} + \frac{J_{vehicle}}{i_A^2}\right) - T_{eng} + \left|\frac{i_B}{i_A} - 1\right| \cdot T_{clB} \right]$$

If the state is considered in which clutch A is gripping and clutch B is preferably disengaged, it is possible, by linear reduction of the clutch torque of clutch A, which is transmitting torque, said clutch is brought into the slipping state. In particular following the grip-to-slip transition of clutch A, the external vehicle torque can be determined. It is also possible that the external vehicle torque is determined after a slip-to-grip transition. In this second method, the external vehicle torque emerges according to the following equation:

$$T_{vehicle} = \frac{1}{i_A \cdot J_{eng}} \cdot$$

-continued
$$(J_{vehicle} \cdot T_{eng} - \text{sign}\{\omega_{eng} - i_A \cdot \omega_{vehicle}\} \cdot \{i_A^2 \cdot J_{eng} + J_{vehicle}\} \cdot T_{clA})$$

If the state is considered in which none of the clutches is gripping, the external vehicle torque may be calculated from the following equation:

$$T_{vehicle} = \dot{\omega}_{vehicle} \cdot J_{vehicle} - \text{sign}(\omega_{eng} - i_A \cdot \omega_{vehicle}) \cdot i_A \cdot T_{clA} - \text{sign}(\omega_{eng} - i_B \cdot \omega_{vehicle}) \cdot i_B \cdot T_{clB}$$

In the aforementioned equations, $\omega_{eng}$ is the engine speed, $\dot{\omega}_{vehicle}$ is the vehicle speed, $\dot{\omega}_{eng}$ is the engine acceleration, $\dot{\omega}_{vehicle}$ is the vehicle acceleration, $T_{eng}$ is the engine torque, $J_{eng}$ is the moment of inertia of the engine, $i_A$ is the overall ratio of the gear of the first, old transmission input shaft, $i_B$ is the overall ratio of the gear of the second, new transmission input shaft, $T_{clA}$ is the transmitted clutch torque of the first, old clutch and $T_{clB}$ is the transmitted clutch torque of the second, new clutch.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principal claim via the features of the particular dependent claim; they are not to be understood as a renunciation of achieving independent protection for the combination of features for the dependent claims that are referenced.

Since the subject matter of the dependent claims may constitute separate and independent inventions in relation to the state-of-the-art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What we claim is:

1. A method for carrying out gear shifting in a twin-clutch transmission having at least two transmission input shafts, each of which is coupled via a respective clutch to an engine, wherein after recognition of a desire to shift, a first clutch from said respective clutches, assigned to the transmission input shaft that is transmitting the torque, is disengaged up to a slip limit and an engine torque($T_{eng}$) is driven as a function of a type of shifting in order to achieve a vehicle acceleration desired by a driver, wherein a torque ($T_{emotor}$) of an electric motor is used as an additional torque.

2. The method as described in claim 1, wherein an additional torque is used to achieve the vehicle acceleration desired by the driver.

3. The method as described in claim 2, wherein, in the driving of the torque ($T_{emotor}$) of the electric motor, the required vehicle acceleration is determined as a function of specific vehicle and/or transmission variables, so that a target torque of the electric motor is calculated and the calculated target torque of the electric motor is used if the target torque is within predetermined minimum and maximum limit values.

4. The method as described in claim 2, wherein said respective clutches further comprise a second clutch and wherein, when the torque ($T_{emotor}$) of the electric motor is insufficient, the clutch torque of one of said first or second clutches is used to control the vehicle acceleration.

5. The method as described in claim 1, wherein the type of shifting is determined shortly before the beginning of the shift.

6. The method as described in claim 5, wherein, when said first clutch is disengaged and when said second clutch is brought into the slipping state by a decrease of the clutch torque of said first clutch, it being decided at the beginning of the slip phase of said second clutch whether the drive train is under pulling load or pushing load in which a check is made of when the slip is positive or negative on said second clutch.

7. The method as described in claim 6, wherein when there is positive slip on said first clutch that is transmitting torque, if an engine speed ($\omega_{eng}$) is somewhat larger than a speed of the active transmission input shaft ($\omega_{inpshaft}$), a pulling load is present, and when there is negative slip, if the engine speed ($\omega_{eng}$) is somewhat smaller than the speed of the active transmission input shaft ($\omega_{inpshaft}$), a pushing load is present.

8. The method as described in claim 5, wherein when the clutch is gripping a check is made of whether the entered engine torque ($T_{eng}$) is larger than the dynamic engine torque ($\dot\omega_{eng} \cdot J_{eng}$).

9. The method as described in claim 8, wherein if the entered engine torque ($T_{eng}$) is larger than the dynamic engine torque ($\dot\omega_{eng} \cdot J_{eng}$) the twin-clutch transmission is in pulling mode, the engine being accelerated if the engaged clutch is disengaged, and if the entered engine torque ($T_{eng}$) is less than the dynamic engine torque ($\dot\omega_{eng} \cdot J_{eng}$), the twin-clutch transmission is in pushing mode.

10. The method as described in claim 5, wherein the state is considered in which none of the clutches is in the gripping state.

11. The method as described in claim 10, wherein the transmitted clutch torque $$(T_{clA/B}^{transferred})$$

is determined from the minimum value of the particular clutch torque $T_{clA/B}$ that is set and the slip limit of the particular clutch $$(T_{clA/B}^{slip}).$$

12. The method as described in claim 10, wherein in pulling mode the following formula applies:

$$\text{sign}(\omega_{eng} - i_A \cdot \omega_{vehicle}) \cdot i_A \cdot T_{clA}^{transferred} + \text{sign}(\omega_{eng} - i_B \cdot \omega_{vehicle}) \cdot i_B \cdot T_{clB}^{transferred} \geq 0$$

and in pushing mode the following formula applies:

$$\text{sign}(\omega_{eng} - i_A \cdot \omega_{vehicle}) \cdot i_A \cdot T_{clA}^{transferred} + \text{sign}(\omega_{eng} - i_B \cdot \omega_{vehicle}) \cdot i_B \cdot T_{clB}^{transferred} < 0$$

whereby,
$\omega_{vehicle}$=vehicle speed,
$i_A$=overall ratio of the gear of the first input shaft,
$i_B$=overall ratio of the gear of the second input shaft, $T_{clA}^{transferred}$ = transmitted clutch torque of the first clutch and $T_{clB}^{transferred}$ = transmitted clutch torque of the second clutch.

13. The method as described in claim 1, wherein the slip limit ($T_{clA}^{slip}$) of said first or second clutch is determined according to the following formula:

$$T_{clA}^{slip} = \left| T_{eng} - J_{eng} \frac{T_{eng} + \frac{T_{vehicle}}{i_A} - \left|\frac{i_B}{i_A} - 1\right| \cdot T_{clB}}{J_{eng} + \frac{J_{vehicle}}{i_A^2}} - \text{sign}\left(1 - \frac{i_B}{i_A}\right) \cdot T_{clB} \right|.$$

14. The method as described in claim 13, wherein an external vehicle torque ($T_{vehicle}$) of the vehicle is determined for determination of the slip limit $$(T_{clA}^{slip}).$$

15. The method as described in claim 14, wherein the external vehicle torque ($T_{vehicle}$) of the vehicle is determined when said first or second clutch is gripping and slipping according to the following formula:

$$T_{vehicle} = i_A \cdot \left[ \dot\omega_{eng}\left(J_{eng} + \frac{J_{vehicle}}{i_A^2}\right) - T_{eng} + \left|\frac{i_B}{i_A} - 1\right| \cdot T_{clB} \right].$$

16. The method as described in claim 14, wherein the external vehicle torque ($T_{vehicle}$) of the vehicle when said first clutch is just starting to slip and when said first clutch is disengaged is determined according to the following formula:

$$T_{vehicle} = \frac{1}{i_A \cdot J_{eng}} \cdot (J_{vehicle} \cdot T_{eng} - \text{sign}\{\omega_{eng} - i_A \cdot \omega_{vehicle}\} \cdot \{i_A^2 \cdot J_{eng} + J_{vehicle}\} \cdot T_{clA}).$$

17. The method as described in claim 14, wherein, if neither of said first and second clutches is gripping, the external vehicle torque ($T_{vehicle}$) of the vehicle is determined according to the following formula:

$$T_{vehicle} = \omega_{vehicle} \cdot J_{vehicle} - \text{sign}(\omega_{eng} - i_A \cdot \omega_{vehicle}) \cdot i_A \cdot T_{clA} - \text{sign}(\omega_{eng} - i_B \cdot \omega_{vehicle}) \cdot i_B \cdot T_{clB}.$$

18. The method as described in claim 1, wherein, in an upshift in pulling mode or a pulling upshift, the engine torque ($T_{eng}$) is increased in order to develop a slip reserve and keep the motor speed above the speed of the old transmission input shaft that is assigned to the starting gear, said first clutch that is assigned to the starting gear is then disengaged with a constant ramp function and said second clutch assigned to the target gear is engaged with the same ramp function, the engine torque ($T_{eng}$) is reduced to a minimum in order to synchronize the engine speed with the speed of the new transmission input shaft that is assigned to the target gear, and the torque ($T_{emotor}$) of the electric motor is driven in such a manner that the vehicle acceleration desired by the driver is achieved.

19. The method as described in claim 1, wherein, in an upshift in pushing mode or a pushing upshift, the engine torque ($T_{eng}$) is reduced to a minimum in order to synchronize the engine speed with the speed of the new transmission input shaft, the vehicle acceleration is driven with said first clutch, said first clutch is disengaged with a constant ramp function if the engine speed drops below the speed of the new shaft, said first clutch is disengaged with a constant ramp function if the engine speed drops below the speed of the new shaft, said first clutch is disengaged with a constant ramp function and said second clutch is engaged and the torque ($T_{emotor}$) of the electric motor is driven in such a manner that the vehicle acceleration desired by the driver is achieved.

20. The method as described in claim 1, wherein, in a downshift in pulling mode or a pulling downshift, the engine torque ($T_{eng}$) is increased in order to synchronize the engine speed with the speed of the new transmission input shaft, the vehicle acceleration is driven with said first clutch, said first clutch is disengaged with a constant ramp function if the engine speed climbs above the speed of the new shaft, said first clutch is disengaged with constant ramp function and the second clutch is engaged if the engine speed climbs above the speed of the new shaft, and the torque ($T_{emotor}$) of the electric motor is driven in such a manner that the vehicle acceleration desired by the driver is achieved.

21. The method as described in claim 1, wherein, in a downshift in pushing mode or a pushing downshift, the engine torque ($T_{eng}$) is reduced to a minimum in order to develop a slip reserve and keep the engine speed under the speed of the old transmission input shaft, said first clutch is disengaged with a constant ramp function and said second clutch is engaged with the same ramp function, the engine torque ($T_{eng}$) is increased in order to synchronize the engine speed with the speed of the new transmission input shaft, and the torque ($T_{emotor}$) of the electric motor is driven in such a manner that the vehicle acceleration desired by the driver is achieved.

* * * * *